United States Patent
Lorkowski et al.

(10) Patent No.: US 6,371,415 B1
(45) Date of Patent: Apr. 16, 2002

(54) AERODYNAMIC COMPONENT WITH A LEADING EDGE FLAP

(75) Inventors: Thomas Lorkowski, Unterhaching; Frank Hermle, Munich; Peter Jaenker, Garching, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/658,905

(22) Filed: Sep. 11, 2000

(30) Foreign Application Priority Data

Mar. 14, 2000 (DE) ..................................... 200 04 499 U

(51) Int. Cl.$^7$ .............................................. B64C 13/24
(52) U.S. Cl. ...................... 244/214; 244/219; 244/75 R
(58) Field of Search ................................ 244/213, 214, 244/215, 216, 217, 75 R; 416/23, 24; 310/330, 328, 331; 60/528, 529; 74/469, 520, 521

(56) References Cited

U.S. PATENT DOCUMENTS

| | | | |
|---|---|---|---|
| 3,698,668 A | * 10/1972 | Cole | ........................... 244/219 |
| 4,113,210 A | * 9/1978 | Pierce | ........................ 244/219 |
| 4,284,254 A | 8/1981 | Rieben | |
| 5,114,104 A | * 5/1992 | Cincotta et al. | ............ 244/219 |
| 5,409,183 A | 4/1995 | Gunsallus | |
| 5,626,312 A | 5/1997 | Head | |
| 6,231,013 B1 | * 5/2001 | Jaenker | ...................... 244/215 |

OTHER PUBLICATIONS

"Development of High–Performing Piezoelectric Actuators for Transport Systems"; by Peter Jaenker et al.; Daimler-Benz AG Research and Technology; Jun. 17–19, 1998.

* cited by examiner

Primary Examiner—Galen L. Barefoot
(74) Attorney, Agent, or Firm—W. F. Fasse; W. G. Fasse

(57) ABSTRACT

An aerodynamic component such as a helicopter rotor blade has an aerodynamic flow profile, a free end and a mounting end forming a blade root for attachment to a rotor mast. A blade section between the root and the free end has a leading edge and a trailing edge as viewed in the flow or chord direction. The blade is enclosed on its suction side and its pressure side with a respective skin. A nose flap or leading edge flap is secured to the leading edge by a bearing or hinge. The blade tilting angle is adjustable by piezo-drive elements arranged in at least one pair forming an actuator for each nose flap. The piezo-elements of a pair are arranged in the chord direction one behind the other and the pair is secured to the body of the blade by a fixed point positioned between the elements of a pair. The expansion and contraction from the piezo-element closer to the trailing edge is transmitted to the flap by a push rod. The expansion and contraction of the piezo-element closer to the leading edge is transmitted to the flap by a pronged pull-fork. The push rod and the pull-fork drive a free end of a lever secured to the flap, whereby a displacement of the push rod or of the pull fork causes the tilting adjustment of the flap by a push-pull action.

18 Claims, 3 Drawing Sheets

AERODYNAMIC COMPONENT WITH A LEADING EDGE FLAP

CROSS-REFERENCE TO RELATED APPLICATION

The present application is related to copending application U.S. Ser. No. 09/334,216, filed on Jun. 16, 1999 and assigned to the same Assignee as the present application.

PRIORITY CLAIM

This application is based on and claims the priority under 35 U.S.C. §119 of German Patent Application 200 04 499.0, filed on Mar. 14, 2000, the entire disclosure of which is incorporated herein by reference.

FIELD OF THE INVENTION

The invention relates to aerodynamic components in general and particularly to helicopter rotor blades having a leading edge flap that is driven by a piezoelectric actuator.

BACKGROUND INFORMATION

In rigid wing aircraft, three spatially separated systems are conventionally used to control the lift, the propulsion, and the steering. Contrary thereto, in a helicopter the main rotor substantially assumes itself the above-mentioned control functions to assure a controlled flight. As a result, the design and construction of a helicopter rotor blade requires numerous compromises due to the non-stationary events that occur during flight of a helicopter. Thus, it is in the nature of a helicopter blade that its aerodynamics are not optimal in certain sections or areas along the blade if the rotor blade construction is fixed. For example, one aspect that is not optimal is the possible dynamic stall when the rotor blade is rotated in the reverse direction.

When a helicopter travels in the forward direction, the rotor blades are exposed along their leading edge to higher flow-on velocities than are effective on the trailing edge due to the vectorial superposition of the flight velocity and the rotational velocity. In order to assure a symmetrical distribution of the lift, the angle of attack of the profile of the rotor blades is cyclically varied for each full revolution of the blade. The faster the helicopter moves in the forward direction, the more angling must be applied to the blade profile along the trailing edge. However, at a certain point such steep angling leads to dynamic stall along locally limited areas of the rotor blade.

On the one hand, the dynamic stall may cause strong vibrations. On the other hand, the dynamic stall limits the performance of the helicopter. Moreover, the flight comfort is noticeably reduced for the pilot and the passengers by the noise caused by the blades and by the vibrations in the passenger cell. Moreover, such vibrations lead to a premature tiring of people and to fatigue failures in the materials of which the helicopter components are made. As a result, an increased inspection and maintenance effort and expense is unavoidable.

The problem can be alleviated by a continuous adaptation of the aerodynamic profile of the rotor blades to the continuously varying aerodynamic operating conditions, for example by means of a shape variable profile geometry. Such a shape variable profile geometry can significantly improve the performance, safety and comfort of helicopters. Starting from different structural possibilities of dynamic lift aids, it is known that a dynamic variation of the leading edge of the flow profile is aerodynamically very effective. For example, high suction peaks along the leading edge of the blade can be reduced by lifting and lowering of a leading edge flap also referred to as nose flap secured to the leading edge of the blade. Such lifting and lowering of the nose flap delays the dynamic stall or flow separation and reduces the hysteresis loops in the course of the aerodynamic coefficients. Additionally, a discrete nose flap makes it possible to provide the required energy for overcoming the aerodynamic forces and moments required for a continuous variation of the contour by an elastic deformation or to provide a larger motion range for these contour deformations.

U.S. Pat. No. 5,409,183 (Gonzales) discloses a helicopter rotor blade with leading edge servo-flaps for pitch positioning the rotor blade. The rotor blade is equipped with a flap that extends in front of the leading edge of the blade because the flap is mounted on two brackets (42) secured to the fixed rotor blade (28). The flap is tiltable or movable about an axis (40) by a hydraulic actuator (44) through a linkage and bellcrank mechanism (46, 48). Such a system has the drawback that the relatively complicated mechanical linkage mechanism does not provide the required high adjustment speeds in response to the control signals. Additionally, the linkage requires a plurality of pivot joints which makes it prone to a high repair requirement. Moreover, such a linkage displaces with its own weight the center of gravity distribution in the rotor blade, thereby causing unfavorable center of gravity conditions.

An article entitled "Development of High Performing Piezoelectric Actuators For Transport Systems", published at a "Actuator 98" meeting on Jun. 17 to 19, 1998 in Bremen, Federal Republic of Germany, describes a helicopter rotor blade having a journalled servo-flap functioning as a trailing edge flap which is adjusted by piezoelectric actuators. These piezo-actuators are distributed in the rotor blade in the longitudinal direction thereof, that is in the span-width direction of the blade. Arranging the piezo-actuators in the span-width direction for driving a leading edge flap would take up a substantial proportion of the available span-width or blade length. Additionally, such a longitudinal distribution of the piezoelectric actuators along the leading edge of the rotor blade would adversely influence the center of gravity distribution in the rotor blade. A pair of piezo-actuators disposed or displaced in the span-width direction furthermore would not be able to apply to the leading edge flap the forces required due to the high air loads, without twisting the leading edge flap.

U.S. Pat. No. 5,626,312 (Head) discloses a piezoelectric actuator or transducer (1) in the form of a torque rod (15, FIG. 3). The torque rod (15) is constructed of a plurality of piezoelectric rod elements (8) that are connected at their ends to end plates (4) and (6) to form a squirrel cage that is installed in a helicopter blade (31) in the lengthwise direction for operating a leading edge flap or a trailing edge flap or both, please see FIGS. 6A and 6B of Head. Due to the lengthwise orientation of the transducer (1) in the rotor blade a substantial installation space is required. Moreover, a substantial number of rod elements (8) forming the squirrel cage contributes to the weight of the blade.

OBJECTS OF THE INVENTION

In view of the above it is the aim of the invention to achieve the following objects singly or in combination:

to construct an aerodynamic component such as the helicopter rotor blade or a wing or the like having a flow profile with a leading edge flap, in such a way that the flap can be adjusted with a high adjustment speed, with high accuracy, with a rapid response characteristic and without play;

to construct a piezo-actuator for such high speed adjustment which requires an optimally reduced maintenance and repair;

to construct the piezo-actuator in such a way that its piezo-elements can be arranged in the chord direction of the aerodynamic component rather than in the span-width or length direction, to thereby avoid changing the center of gravity characteristics of modern rotor blades;

to provide the above-mentioned high speed adjustments even for extreme flight maneuvers and conditions;

to avoid a plurality of pivoted rod linkage and bellcrank elements as well as torque generating piezoelectric elements that require a substantial installation length;

to construct a piezo-actuator for adjusting a flap on an airfoil with an optimal performance while the actuator has a minimal weight; and to construct the actuator in such a way that the flap adjustment is accomplished by a push-pull action.

SUMMARY OF THE INVENTION

A component having an aerodynamic flow profile such as a helicopter rotor blade having at least one leading edge flap or nose flap along its leading edge is characterized according to the invention in that each nose flap is driven by a piezo-actuator which comprises two piezo-elements forming a pair. The piezo-elements are arranged one behind the other in the chord direction of the rotor blade. The two piezo-actuator elements are secured to a fixed point positioned between the piezo-elements. The fixed point is part of or fixed to the blade body. The power output of the two serially arranged piezo-actuator elements is transmitted to the nose flap by a push rod and by a two-pronged member referred to herein as fork. One end of the push rod is operatively connected to the piezo-actuator element closer to the trailing edge of the rotor blade. The two-pronged member is operatively connected to the piezo-actuator element positioned closer to the leading edge of the blade. The other end of the push rod and the other end of the two-pronged fork are operatively connected to a free end of a lever which in turn is rigidly connected to a journal of the leading edge flap for operating the leading edge flap by a push-pull action.

Advantages of the invention are seen in that the push-pull action is a rapid action which provides the required adjustment speeds of the leading edge flap even for extreme flight maneuvers. Further, the arrangement of the piezo-actuator elements in the chord direction provides a very compact construction which does not disturb the center of gravity distribution of the blade. More specifically, the center of gravity distribution in a conventional rotor blade is maintained where the present actuator take up 25% of the relative profile depth. Another advantage of the invention is seen in that the integration of the piezo-actuator elements into the rotor blade in the chord direction avoids a mechanical linkage that requires a substantial number of link elements, bellcranks and detouring pivot joints which require a large installation space and do not act fast enough. The piezo-elements arranged in the chord direction permit a compact construction which has the added advantage of requiring little maintenance work. Moreover, the present construction satisfies the requirements that are to be met especially for helicopter rotor blades, namely a low profile that requires a small installation space, that can take up high centrifugal forces, and provides a high performance while simultaneously being lightweight. The actuator characteristics of piezo-ceramic elements are based on the inverse piezoelectric effect. More specifically, piezo-ceramic elements having such an effect are solid bodies which change their dimensions in response to an exposure to a directed electrical field. Due to such a solid body characteristic a very high force level, a high precision, and a high dynamic or response speed can be achieved without play. Piezo-actuators of this type comprise a multitude of separate piezo-layers which are stacked to form a column of piezo-layers with electrodes interposed between the piezo-layers to contact these layers for the application of the required energizing voltage. The electrodes are selectively connected to voltages having opposing polarities. The piezoelectric layers expand and contract in the longitudinal direction of the column or stack. As a result, the expansions and contractions are summed in response to the electrical energizing of the individual piezo-layers, whereby the obtainable output of the solid piezo-column is substantially increased to provide a high performance density, so to speak, which makes it possible to completely integrate the piezo-actuators into the rotor blade contour even in the chord direction. Merely three electrical conductors are required for the energy supply length-wise through the rotor blade. The supply of electrical energy to the three conductors takes place at the rotor drive shaft or mast through conventional slip or collector rings.

According to the invention the power generated by the expansion and contraction of the piezo-elements in the blade length direction, is preferably redirected by respective force direction changing frames, each of which surrounds its piezo-element.

More specifically, the redirection of the power output from the first piezo-element positioned closer to the trailing edge of the blade to the noseflap is accomplished by the above-mentioned push rod which passes directly through both piezo-elements and through both force direction changing frames, whereby the push rod is guided through holes in the piezo-elements or through holes in spacer elements. The redirection of the power output of the second blade positioned closer to the leading edge, to the nose flap is accomplished by the above fork connected with one end of its two prongs to the respective force direction changing frame.

Instead of using a push rod and a fork acting as a pull element, two forks could be used. The prongs of one of the forks for transmitting the output of the rearwardly positioned piezo-element would bypass both piezo-elements thereby requiring more space in the chord depth or blade height direction. Therefore, and due to the required bending of the prongs of the one fork and due to the limited strength of materials for making the forks, it is preferred to use a push rod for the transmission of the piezo-expansion from the rearwardly positioned piezo-element to the leading edge flap and a fork for the transmission of the piezo-expansion from the forwardly positioned piezo-element. The arrangement of the push rod passing through the first and second piezo-element requires little space and achieves a small structural height or low profile in the blade depth direction while simultaneously providing a symmetric force introduction into the leading edge flap from the piezo-actuator elements forming a pair.

The holes in the piezo-elements are simply drilled directly into the piezo-elements. However, it is preferred to construct the piezo-elements of two sections each and to insert a spacer member between the two piezo-sections of a piezo-element. The holes for passing and guiding the push rod in the chord direction through the piezo-elements are provided in the spacer elements. The hole diameter provides a guided sliding fit of the push rod through the respective spacer member. The spacer members are made of metal. However, due to the specific material characteristics of lithium fluoride (LiF) that material is preferred for making the spacer members. In addition to guiding and spacing the push rod from the piezo-elements the spacer members also perform a temperature compensation function because the piezoelectric elements have a smaller temperature expansion coefficient than the metal components that surround the piezo-elements for the force transmission as will be described in more detail below. The temperature compensation by the spacer members prevents or reduces any performance loss of the actuator system in response to heat. Another advantage of the spacer members is seen in that it is not necessary to provide a hole in the stack or column of piezo-layers. Instead, two stack sections are simply spaced from each other by the spacer members which facilitates the arrangement of the electrodes in the stack sections because holes need not to be drilled where electrodes might otherwise be positioned. Since the spacer members are not made of piezo-material, there is a minute power or performance reduction which are easily compensated by respectively dimensioning the piezo-elements in the actuator and selecting the number of piezo-layers needed for obtaining a required output in the form of the dimension of the expansion and contraction of the two piezo-columns.

The arrangement of the piezo-elements so that the respective column is physically oriented in the blade length direction and so that the respective expansion and contraction also takes place in the blade length direction, has the advantage that disturbing effects caused by the high acceleration forces prevailing in an operating helicopter rotor blade can be minimized, since no force transmitting motions of the push rod and fork take place crosswise to the acceleration direction of the blade. The force transmission for the adjustment motion of the position of the nose flap from the piezo-elements to the flap takes advantageously place in the chord direction and hence the acceleration direction, whereby the direction transformation redirection of the force is accomplished by the above mentioned push-pull arrangement connected to the respective piezo-column by the force direction changing frames.

Preferably, these force direction changing frames are solidly constructed frames, preferably having a rhombic or rectangular frame configuration surrounding the respective piezo-element or column. Each frame comprises frame sections preferably in the form of leaf springs which are interconnected through pivot joints preferably integrally formed in the frame sections for interconnecting the frame sections to form a four-bar linkage which kinematically transforms the expansion and contraction of the respective piezo-element into a force directed perpendicularly to the expansion direction and thus in the chord direction. The force direction transforming frame increases or amplifies the expansion distance of the piezo-element whereby the respective force is reduced in accordance with the law of levers. Such a force transformation frame structure as just described is absolute free of play and any loss of energy in the bending zones of the frame sections are negligibly small. Thus, the frame structure with its pivot joints assures a coupling free of play between the respective piezo-element and the leading edge flap so that canting of the individual frame sections is prevented even at high acceleration forces.

If the force transformation frame, the push rod and the pull fork are used in combination, a further advantage is achieved in that the push-rod can also pass through both force transformation or force direction changing frames to transmit the expansions from the first or rear piezo-element forwardly to the leading edge flap. Providing the frame sections with the required holes for the passage of the push rod does not pose any problems because the frame sections are preferably made of a metallic material. mentioned, the two piezo-elements forming a pair are arranged one behind the other in the chord direction. The piezo-elements of the pair are structurally secured to the body of the rotor blade by a fixed point positioned between the two members of the pair of piezo-elements. A mechanical bias force applied to the piezo-elements is advantageous in the operation of piezo-elements for preventing the application of tension loads to the piezo-elements. Such mechanical tension force can be applied by adjustment screws which may serve simultaneously for the geometric fine positioning of the leading edge flap. In an alternative embodiment the biasing of the piezo-elements may be accomplished by springs which are arranged around the piezo-elements. However, it is particularly advantageous to interconnect the piezo-elements electrically in such a way that they operate in a push-pull fashion. Thus, when one piezo-element of a pair expands, the other contracts and vice versa. The force transmission is then performed in such a way that one piezo-element tilts the leading edge flap downwardly while the other piezo-element turns the flap upwardly. In this manner the piezo-elements are not exposed to any tension loads, whereby the above-mentioned mechanical biasing force is applied by one piezo-element to the other and vice versa.

The biasing of the piezo-elements can additionally be increased electrically by a so-called offset voltage applied to the piezo-elements. The value of the offset voltage corresponds advantageously to one half of the maximum voltage that may be applied to the particular piezoelectric elements in accordance with specifications provided by the manufacturer of these elements. The effect of the offset voltage causes a certain deflection or expansion of the piezo-elements, thereby biasing each other.

Under certain flight conditions it may be necessary to tilt the nose flap upwardly and downwardly at different times relative to the central chord line. However, due to aerodynamic considerations it is preferred to tilt the nose flap only downwardly relative to the central chord line and up again only to the central chord line at which the nose flap assumes a neutral position. Any motion of the nose flap upwardly above the central chord line is prevented by a respective stop. Due to this stop the piezo-elements do not have to expand for the purpose of moving the flap upwardly. As a result a high blocking force for keeping the leading edge flap in this neutral position can be applied by a stationary stop secured to the body of the blade. Due to aerodynamic reasons the neutral position of the flap is primarily required in the forwardly rotating rotor blade.

The nose flap is preferably so-constructed that it forms the leading edge of the blade including its flow profile along the entire length of the noseflap. Such a structure does not differ aerodynamically in its profile in the neutral position of the nose flap from a conventional flow profile constructed for the same purpose. There may be situations, such as structural conditions, making it necessary to journal the nose flap outside of the respective blade section contour or profile. However, the integration of the nose flap into the blade section provides an aerodynamically more advantageous profile or contour when the nose flap is in its neutral position and when it is in its deflected position. Another advantage of integrating the nose flap into the contour or profile of the blade is seen in that such integration is structurally simpler than nose flaps that are journalled outside the blade. Additionally, the integration also facilitates the exchangeability of the nose flap and thus of the erosion protection provided along the leading edge. In other words, the erosion protection may be provided also along the outwardly facing surfaces of the nose flap.

Another advantage of the structure according to the invention is seen in that the energization and the power output of the piezo-elements provides the required high adjustment speeds in combination with a high force level without friction and without play. These advantages are most effectively utilized if the bearing to which the nose flap is journalled to the blade section is a precision anti-friction bearing such as a roller bearing or bearing box.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
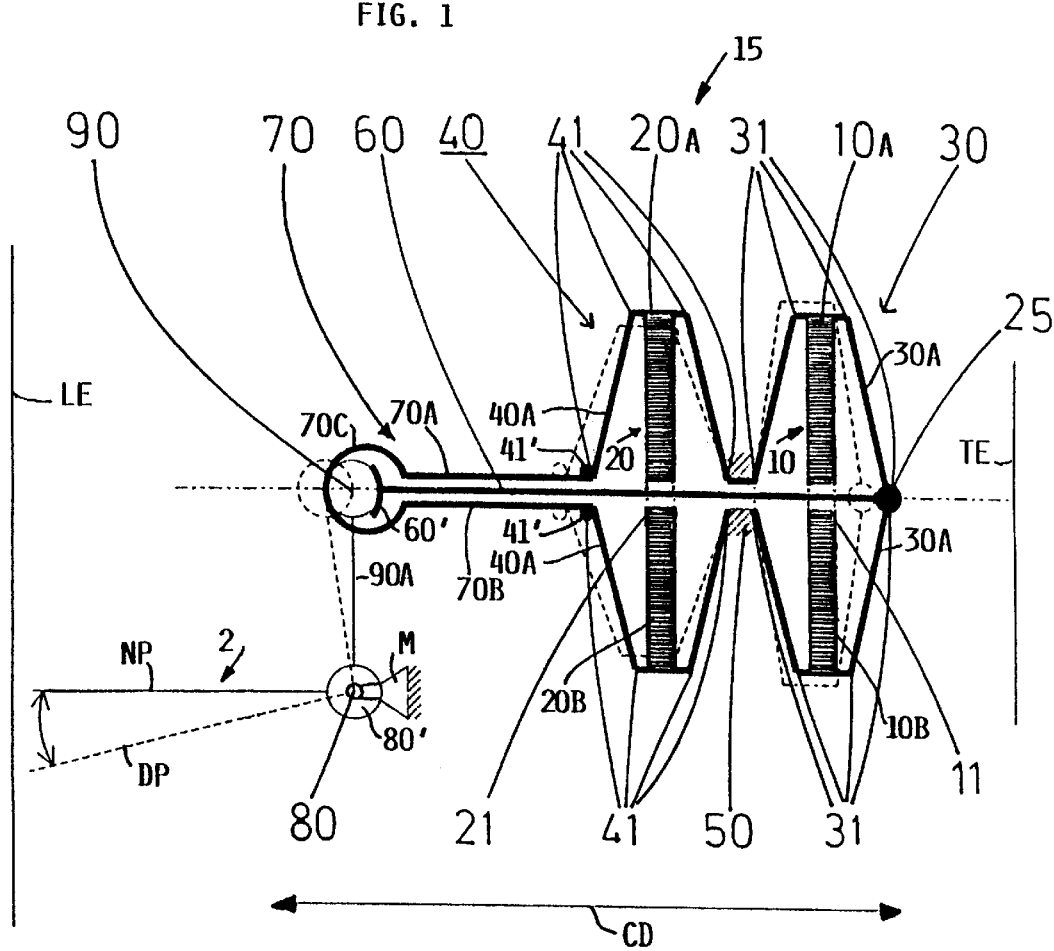
FIG. 1 is a sectional schematic view of the piezo-drive according to the invention for adjusting a nose flap of an aerodynamic component, whereby the sectional plane extends longitudinally through an aerodynamic component as viewed in the direction of the arrow I in FIG. 2.

The sectional view of FIG. 1 shows schematically the present piezo-drive 15 with piezo-drive elements 10 and 20 extending longitudinally of an aerodynamic component not shown. The chord plane of the aerodynamic component extends perpendicularly to the drawing sheet and to the sectional plane. The aerodynamic component is, for example a helicopter rotor blade 1 shown in FIGS. 2 and 3. A leading edge or nose flap 2 is shown in FIG. 1 only as a horizontal line NP representing the neutral position of the nose flap 2.

The first piezo-element 10 is positioned closer to a trailing edge TE while the second piezo-element 20 is positioned between the first element and the leading edge LE. Thus, the two piezo-drive elements 10 and 20 forming a pair are oriented according to the invention in the chord direction of the aerodynamic component such as a helicopter rotor blade 1 shown in FIG. 2. In FIG. 1, the blade length direction extends perpendicularly to the chord direction CD. Thus, the elements 10 and 20 expand and contract in the blade length direction as indicated by the dashed line positions in FIG. 1. The elements 10 and 20 are connected to a fixed point 50 within the body structure of the blade 1. The fixed point 50 is positioned centrally between the two piezo-elements and the connection is preferably by means of respective force direction changing frames 30 and 40.

The force direction changing frames 30 and 40 convert the length-wise expansion and contraction motion of the piezo-elements 10 and 20 into a force that is directed in the chord direction CD or flow direction. For this purpose the force direction changing frames 30 and 40 are constructed of frame sections 30A and 40A respectively. The frame sections 30A, 40A are hinged or pivoted to each other by hinge joints 31 and 41, whereby two so-called four lever linkage devices are formed. In order to protect the piezo-elements 10 and 20 against tension loads, a so-called biasing offset voltage is applied to the piezo-elements 10 and 20. This offset voltage corresponds to about 50% of the maximum energizing voltage that may be applied to the piezo-elements. The maximum voltage information is provided by the manufacturer of the piezo-elements. The energizing voltage is applied to the layers of the piezo-elements in opposing polarities so that the two elements forming a pair cooperate in push-pull fashion. For example, if the first element 10 expands, then the second element 20 contracts as shown by dashed lines in FIG. 1. As a result, the force direction changing frame 30 is contracted in the chord direction CD while the force direction changing frame 40 is expanded in the chord direction CD, as the dashed lines show. These motion changes are possible due to the pivot hinges 31 and 41. Further, the frame 30 is hinged by a pivot joint 25 to a push rod 60 which transmits the resulting force for the adjustment of the leading edge flap 2 as will be described in more detail below. A two-pronged pulling fork 70 is hinged at 41' to the frame 40.

The push rod 60 can be mounted in one of two ways. In both instances it passes through the piezo-elements 10 and 20. In one embodiment the piezo-elements are provided with central holes through which the push rod 60 extends with a sliding fit. In the other embodiment the piezo-elements 10 and 20 are each divided into two sections 10A and 10B and 20A and 20B. A spacer 11 is inserted between the two sections 10A and 10B. Another spacer 21 is inserted between the sections 20A and 20B. Each spacer is provided with a through guide hole for the push rod 60. The use of spacer elements 11 and 21 is preferred over holes directly in the piezo-elements 10, 20 because drilling holes through the piezo-stacks may be difficult if damaging electrodes in the stacks must be avoided. In both instances the motion of the push rod 60 is guided in the respective holes.

The left-hand end of the push rod 60, as shown in FIG. 1, is provided with a saddle end 60' that contacts an upper free end 90 of a flap moving lever 90A for pushing the lever 90A into the dashed position, thereby moving the leading edge flap 2 from the neutral position NP into the dashed line down position DP. For this purpose the lower end of the lever 90A is rigidly secured to a journal 80' of the flap 2 mounted on a bearing 80, preferably a high precision bearing such as an antifriction roller bearing or a bearing box that is rigidly mounted to the structure M of the rotor blade 1. The journal 80' is rigidly secured to the flap 2 but rotatable relative to the bearing 80.

The motion of the lever 90A out of the dashed line position back into the full line position is accomplished according to the invention by the operation of the second piezo-element 20 through the force direction changing frame 40 hinged to the two-pronged pulling fork 70. The right-hand ends of the two prongs 70A and 70B of the pulling fork 70 are journalled at 41' to the frame 40 while the left-hand end of the pulling fork 70 forms a ring 70C that contacts the upper end 90 of the lever 90A opposite the saddle 60'. As the piezo-element 20 expands from the dashed line position of the frame 40 into the full line position of the frame 40, the pulling fork 70 moves to the right to bring the lever 90A back into the full line position and the flap 2 into the neutral position NP. The adjusted force level remains constant for the push and the pull motions. As the piezo-element 20 expands to move the frame 40 back into the full line position, the push rod 60 is also brought back into the right-hand full line position of the frame 30 as shown in FIG. 1.

Figure 2:
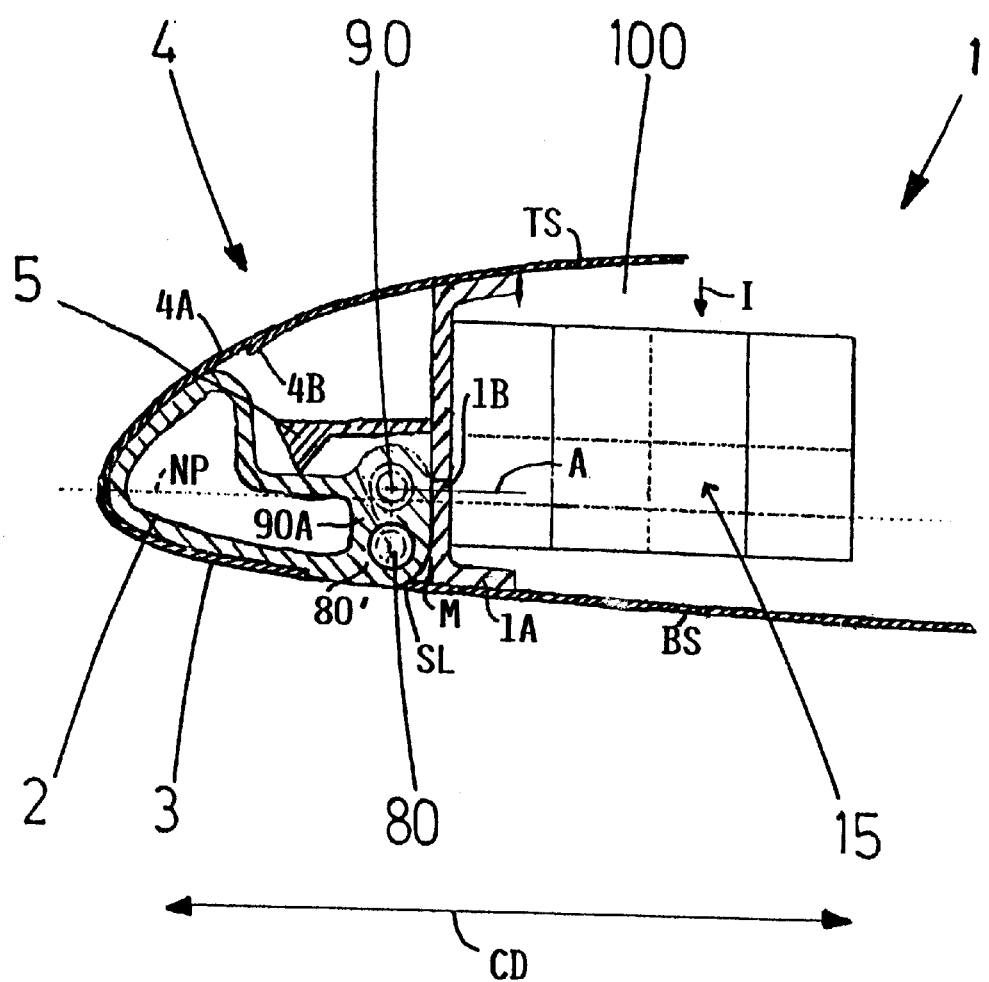
FIG. 2 is a sectional view through a chord plane of an aerodynamic component equipped with a nose flap driven by the present piezo-drive and also illustrating a stop for limiting the upward tilting of the nose flap.

FIG. 2 shows a sectional through the leading edge LE of a helicopter rotor blade 1, whereby the section plane extends in the flow or chord direction CD and the length direction extends perpendicularly to the plane of the drawing sheet. The blade 1 is equipped with the nose flap 2 which is provided with a corrosion protection coating or layer 3. The bearing 80 is rigidly secured by the mounting M to the body of the blade 1 such as a spar 1A. The force transmission described above with reference to FIG. 1 is symbolically illustrated in FIG. 2 by the double arrow A passing through a hole 1B in the spar 1A of the blade 1. The upper end 90 of the lever 90A is contacted by the push rod 60 and the pulling fork 70 as described above. The leading edge flap 2 is shown in the neutral position NP, whereby the profile of the flap 2 merges smoothly into the aerodynamic profile of the blade 1. The body of the blade 1 is enclosed by a top skin TS and a bottom skin BS. A junction area 4 between the nose flap 2 and the blade 1 includes a flap lip 4A tapering toward the trailing edge TE of the blade 1 and positioned and formed to ride over a lip edge 4B of the top skin TS as shown in FIG. 2. This construction provides an external profile appearance of the blade 1 that is undistinguishable from a conventional rotor blade.

FIG. 2 further shows that the leading edge flap 2 is limited in its upward motion by a stop 5 rigidly connected to the spar 1A of the body of the blade. A tilting motion of the flap 2 into a position above the neutral position NP is undesirable and such motion is prevented with a high blocking force by the rigid stop 5. In the position shown the flap 2 forms the leading edge LE of the blade 1 and thus also provides the above mentioned corrosion protection 3 for the leading edge. The bearing 80 is preferably a precision antifriction bearing that needs to take up relatively small transversal aerodynamic forces effective in the length or span width direction of the blade 1. The high biasing forces of the piezo-drive 15 are taken up by the journal 80' rigidly secured through the mounting M to the body structure of the blade 1 such as the spar 1A. The journal 80' is rounded at its edges so that the downward movement of the flap is readily possible.

Referring further to FIG. 2, a sealing lip SL is installed between the flap 2 and the bottom skin BS of the blade 1. This sealing lip SL functions similar to a movable windshield wiper blade made of rubber, for example. Incidentally, the seal between the trailing edge 4A of the flap 2 and the lip edge 4B is provided with a bending biasing force to provide a tight seal, whereby it is preferably that the edge lip 4B is made of polytetrafluoroethylene (PTFE). Alternatively, a sealing molding having a V-cross-sectional configuration may be integrated inside the blade profile.

Figure 3:
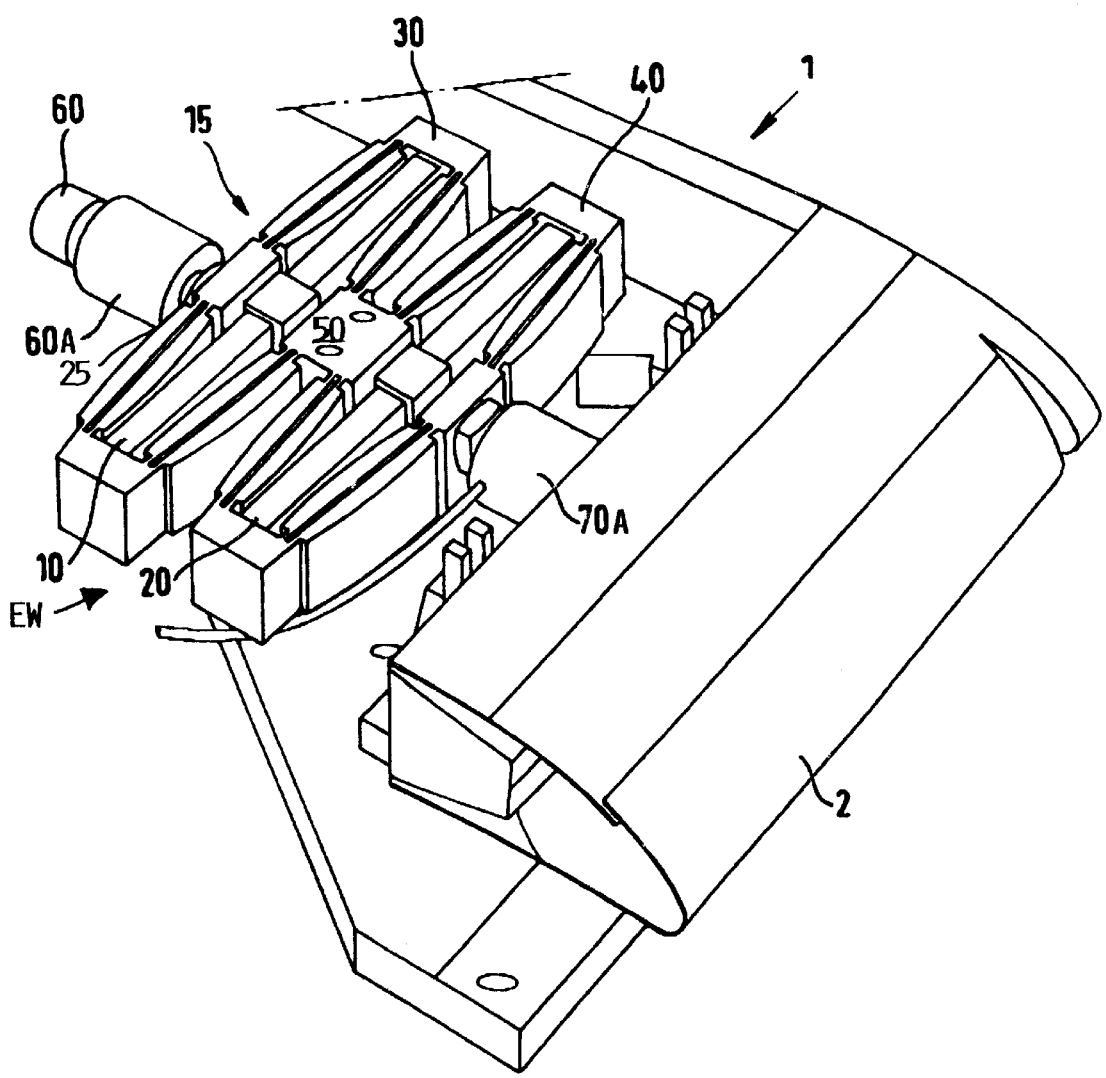
FIG. 3 is a perspective view of the present piezo-drive installed in a helicopter rotor blade having a nose flap driven by the present piezo-drive, whereby a broken away portion of the blade is shown.

FIG. 3 is a perspective view into a partially broken-away section of the rotor blade 1 into which the nose flap 2 and the piezo-drive are installed. From an aerodynamic point of view large flaps 2 with large tilting angles are desirable. These requirements, however, result in ever larger loads to be taken up by the piezo-drive 15. Thus, it is necessary to find an optimal compromise. According to the invention such a compromise provides the nose flap 2 with a width in the chord direction corresponding to 10% of the blade width or depth in the chord direction while simultaneously permitting a 10° maximal angular flap adjustment range between the neutral position NP and the down position DP. It has been found that such a configuration results in a maximal lift coefficient of 17%. According to the invention the angle of attack of the blade 1 has been increased by 2.5% relative to a conventional blade of the same external configuration and flow profile at which the drag increases substantially and at which the stall angle becomes effective. This is a substantial improvement. The characteristic force values of the piezo-actuator elements 10 and 20 are expressed as a blocking force of 800N (Newton) for a free expansion and contraction of 1.2 mm of the elements 10 and 20. These values are selectable in a wide range and thus the invention can be readily adapted to any particular actual use requirements.

FIG. 3 also shows symbolically electrical wiring EW through which the piezo-elements 10 and 20 are energized. When the elements are energized the expansions and contractions in the span width direction or length direction of the blade 1 are converted by the frames 30 and 40 into forces in the flow or chord direction through the push rod 60 and the pull fork 70 as described above. The push rod 60 is shown in FIG. 3. However, the pulling fork 70 is not seen in FIG. 3.

In order to monitor the force level and for measuring the force characteristics of the present piezo-drive system 15 two load cells 60A and 70A are integrated into the load path of the present drive system, whereby the push rod 60 passes through the load cell 60A. The wiring for the load cells 60A and 70A is not shown in FIG. 3. These load cells are only provided for monitoring the system and are not necessary for the function of the piezo-drive 15.

In the particular embodiment, in order to achieve the flap adjustment range of 10° and taking into account that each piezo-actuator element 10, 20 provides an 0.6 mm adjustment range in the flow or chord direction, the lever 90A had an on-center length of 3.2 mm. Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A component having an aerodynamic flow profile, said component comprising a profile body having a leading edge, a trailing edge, and at least one profile section positioned between ends of said profile body, a leading edge flap (2), a flap bearing (80) tiltably mounting said leading edge flap to said profile section for tilting about a bearing axis extending lengthwise in said component, a piezoelectric drive connected to said leading edge flap for tilting said leading edge flap, said piezoelectric drive comprising at least a first piezo-drive element (10) and a second piezo-drive element (20) arranged one behind the other in a chord direction (CD) of said profile section, so that said first piezo-drive element (10) is positioned to face said trailing edge (TE) and said second piezo-drive element (20) is positioned to face said leading edge (LE), a fixed mounting point (50) secured in said profile body between said first and second piezo-drive elements for movably holding said first and second piezo-drive elements, a lever (90A) having a first lever end (80') rigidly connected to said leading edge flap (2) and a second lever end (90), a first force transmitting member (60) positioned for transmitting a piezo-motion of said first piezo-drive element (10) to said second lever end (90) and a second force transmitting member (70) positioned for transmitting a piezo-motion of said second piezo-drive element (20) to said second lever end (90) for causing a flap motion of said leading edge flap (2) in response to said piezo-motions.

2. The component of claim 1, wherein said first and second piezo-drive elements comprise respectively a first hole and second hole aligned with each other, and wherein said first force transmitting member (60) of said first piezo-drive element is a rod extending through said aligned holes for transmitting said piezo-motion of said first piezo-drive element (10) to said second lever end (90).

3. The component of claim 2, wherein said second force transmitting member (70) of said second piezo-drive element (20) is in contact with one side of said second lever end (90), and wherein said force transmitting rod (60) is in contact with an opposite side of said second lever end (90) for a push-pull action.

4. The component of claim 2, wherein said second force transmitting member (70) is a pulling fork having two prongs (70A, 70B), and wherein said force transmitting rod (60) extends at least partly between said two prongs (70A, 70B) of said pulling fork.

5. The component of claim 4, wherein said second force transmitting member (70) comprises a ring (70C) interconnecting said two prongs (70A, 70C), said ring (70C) surrounding said second lever end (90) to contact said second lever end on one side, and wherein said force transmitting rod (60) extending at least partly between said two prongs contacts said second lever end (90) on an opposite side of said second lever end opposite said ring (70C).

6. The component of claim 2, further comprising a first spacer member (11) in said first piezo-drive element (10) and a second spacer member (21) in said second piezo-drive element (20), wherein said first and second holes extend through said spacer members (11, 21) respectively, and wherein said force transmitting rod (60) passes through said spacer members (11, 21) forming guides for said force transmitting rod (60) extending toward said leading edge into contact with said second lever end (90).

7. The component of claim 1, further comprising means (30, 40) for directing or changing said piezo-motion of said first piezo-drive element (10) and said motion of said second piezo-drive element (20) into a motion direction extending in a chord direction from said trailing edge to said leading edge, said means for directing (30, 40) being operatively interposed between said first and second piezo-drive elements (10, 20) and said first and second force transmitting members (60, 70).

8. The component of claim 7, wherein said means (30, 40) for directing or changing comprise frame structures (30, 40) surrounding said first and second piezo-drive elements (10, 20), frame elements (30A, 40A) and pivotal couplers (25, 31, 41, 41') connecting said frame structure through said frame elements (30A, 40A) to said fixed mounting point (50) and to said first and second force transmitting members (60, 70) for transmitting motion of said first and second piezo-drive elements (10, 20) in said motion direction extending in said chord direction.

9. The component of claim 8, wherein said frame structures (30, 40), said frame elements (30A, 40A) and said pivotal couplers (25, 31, 41, 41') form a bellows.

10. The component of claim 8, wherein said frame elements (30A, 40A) are leaf spring sections interconnected with their ends by said pivotal couplers (25, 31, 41, 41').

11. The component of claim 7, wherein said means of directing or changing said piezo-motion comprise at least one passage extending through said fixed mounting point (50), wherein said first and second piezo-drive elements comprise holes axially aligned with said at least one passage, and wherein said first force transmitting member (60) is a push rod extending through said passage and through said holes in a chord direction from said trailing edge to said leading edge of said component.

12. The component of claim 1, further comprising an electrical energizing circuit connected to said first and second piezo-drive elements (10, 20) for energizing said first and second piezo-drive elements in such a way that said first piezo-drive element expands when said second piezo-drive element contracts and vice versa for a push-pull operation.

13. The component of claim 12, wherein said electrical energizing circuit comprises an offset voltage source for providing a biasing voltage for said first and second piezo-drive elements, and wherein said biasing voltage corresponds to 50% of a maximal energizing voltage applicable to said first and second piezo-drive elements.

14. The component of claim 1, further comprising a stop (5) positioned in said at least one profile section for limiting an upward tilting of said leading edge flap so that said leading edge is tiltable downwardly and upwardly only up to said stop.

15. The component of claim 1, wherein said leading edge flap forms a leading edge of said component along a length of said leading edge flap.

16. The component of claim 15, wherein said component is a helicopter rotor blade and said leading edge flap forms part of said leading edge of said rotor blade along a full length of said leading edge flap.

17. The component of claim 1, wherein said flap bearing is a precision antifriction bearing.

18. The component of claim 17, wherein said antifriction bearing is a roller bearing or a ball bearing or a ball box bearing.

* * * * *

UNITED STATES PATENT AND TRADEMARK OFFICE
CERTIFICATE OF CORRECTION

PATENT NO. : 6,371,415 B1 Page 1 of 1
DATED : April 16, 2002
INVENTOR(S) : Lorkowski et al.

It is certified that error appears in the above-identified patent and that said Letters Patent is hereby corrected as shown below:

Title page,
Item [30], Foreign Application Priority Data, replace "200 04 499 U" by
-- 200 04 499.0 --;

Column 6,
Line 2, after "material.", insert -- As --.

Signed and Sealed this

Fifteenth Day of October, 2002

Attest:

Attesting Officer

JAMES E. ROGAN
*Director of the United States Patent and Trademark Office*